United States Patent
Baptist et al.

(10) Patent No.: US 10,142,176 B2
(45) Date of Patent: Nov. 27, 2018

(54) UTILIZING REALLOCATION VIA A DECENTRALIZED OR DISTRIBUTED, AGREEMENT PROTOCOL (DAP) FOR STORAGE UNIT (SU) REPLACEMENT

(71) Applicant: International Business Machines Corporation, Armonk, NY (US)

(72) Inventors: Andrew D. Baptist, Mt. Pleasant, WI (US); Manish Motwani, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/936,608

(22) Filed: Mar. 27, 2018

(65) Prior Publication Data
US 2018/0219731 A1    Aug. 2, 2018

Related U.S. Application Data

(63) Continuation of application No. 15/212,749, filed on Jul. 18, 2016, now Pat. No. 9,992,063.

(51) Int. Cl.
*G06F 15/177* (2006.01)
*H04L 12/24* (2006.01)
(Continued)

(52) U.S. Cl.
CPC .......... *H04L 41/0813* (2013.01); *H04L 41/12* (2013.01); *H04L 49/901* (2013.01);
(Continued)

(58) Field of Classification Search
CPC ... H04L 41/0813; H04L 41/12; H04L 49/901; H04L 67/146; H04L 67/1097; H04L 67/148
See application file for complete search history.

(56) References Cited

U.S. PATENT DOCUMENTS 4,092,732 A     5/1978   Ouchi
5,454,101 A     9/1995   Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Richard G Keehn
(74) *Attorney, Agent, or Firm* — Garlick & Markison; Timothy W. Markison; Shayne X. Short

(57) ABSTRACT

Based on a system configuration change (e.g., of a Decentralized, or Distributed, Agreement Protocol (DAP)) within a dispersed storage network (DSN) (e.g., from a first to a second system configuration of the DAP), a computing device directs a storage unit to be replaced (SUTBR) to transfer encoded data slices (EDSs) stored therein to a replacement storage unit (RSU). During transfer of the EDSs (e.g., from SUTBR to RSU), the computing device directs the SUTBR to service read and/or write requests for EDS(s) stored therein to operate based on a first system configuration of the DAP. When the EDSs have been successfully transferred from the SUTBR to the RSU, the computing device directs the RSU to service read and/or write requests for the EDS(s) stored therein to operate based on a second system configuration of the DAP.

20 Claims, 13 Drawing Sheets

(51) Int. Cl.
  *H04L 12/879* (2013.01)
  *H04L 29/08* (2006.01)
(52) U.S. Cl.
  CPC ........ *H04L 67/1097* (2013.01); *H04L 67/146* (2013.01); *H04L 67/148* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2015/0378616 | A1* | 12/2015 | Khadiwala ............ G06F 3/0659 711/114 |
| 2015/0378626 | A1* | 12/2015 | Motwani ................ G06F 3/067 711/114 |
| 2015/0378822 | A1* | 12/2015 | Grube ................ G06F 11/1092 714/763 |
| 2015/0381730 | A1* | 12/2015 | Resch ................ H04L 67/1097 709/225 |
| 2015/0381731 | A1* | 12/2015 | Grube ................ H04L 67/1097 709/224 |
| 2016/0124657 | A1* | 5/2016 | Resch .................... G06F 3/065 711/114 |
| 2016/0179618 | A1* | 6/2016 | Resch ................ H04L 67/1097 714/764 |
| 2016/0188253 | A1* | 6/2016 | Resch .................... G06F 3/0647 711/172 |
| 2016/0321136 | A1* | 11/2016 | Baptist .................. G06F 3/0619 |
| 2016/0350171 | A1* | 12/2016 | Resch ................ G06F 11/0787 |
| 2016/0350329 | A1* | 12/2016 | Resch .................... G06F 3/0622 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association or Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

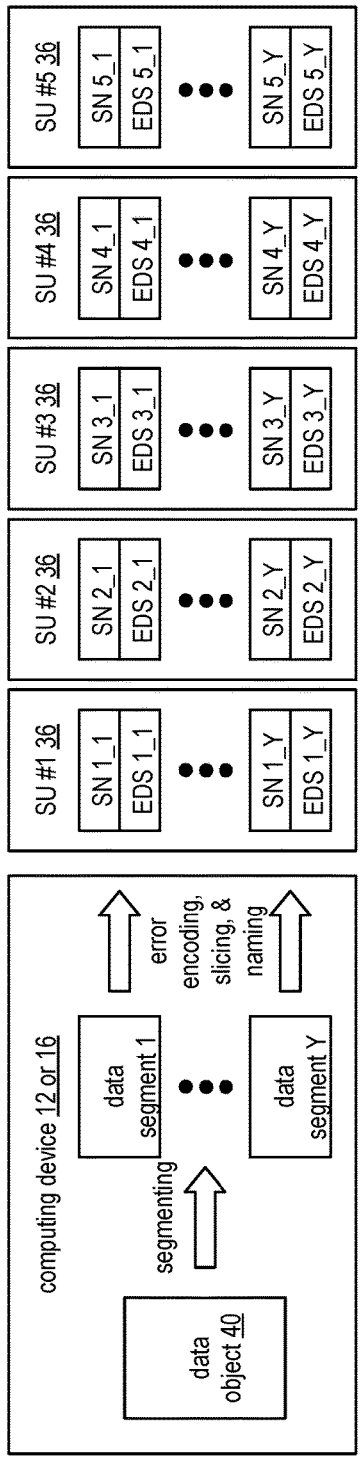
FIG. 3
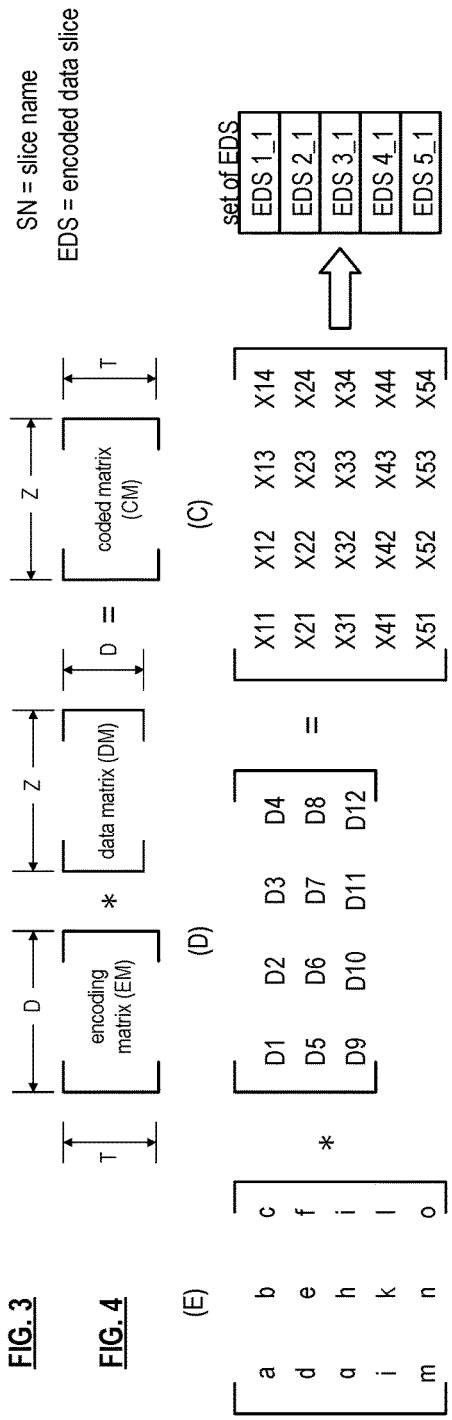
FIG. 4
FIG. 5
FIG. 6

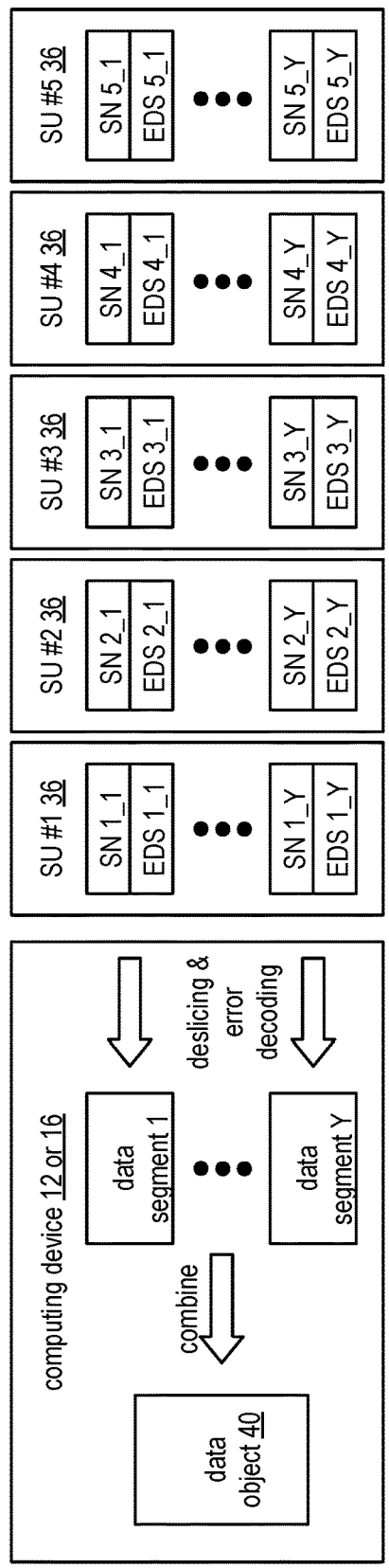

UTILIZING REALLOCATION VIA A DECENTRALIZED OR DISTRIBUTED, AGREEMENT PROTOCOL (DAP) FOR STORAGE UNIT (SU) REPLACEMENT

CROSS REFERENCE TO RELATED PATENTS

The present U.S. Utility patent application claims priority pursuant to 35 U. S.C. § 120, as a continuation of U.S. Utility patent application Ser. No. 15/212,749, entitled "UTILIZING REALLOCATION VIA A DECENTRALIZED, OR DISTRIBUTED, AGREEMENT PROTOCOL (DAP) FOR STORAGE UNIT (SU) REPLACEMENT," filed Jul. 18, 2016, pending, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within memory storage systems, there may be many reasons for a change of the number of storage units deployed therein. For example, there may be instances in which a storage unit is replaced (e.g., the storage unit is performing poorly, the storage unit is past a certain age at which failure is expected, etc.). When this happens, other devices in the system may need to coordinate with one another to accommodate not only the removal of the storage unit but also the bringing on line and integration of a newly added storage unit to the overall system. The prior art does not provide an adequate means by which such system changes, modification, etc. including the replacement of a storage unit may be made without deleteriously affected overall system performance.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

Figure 16:
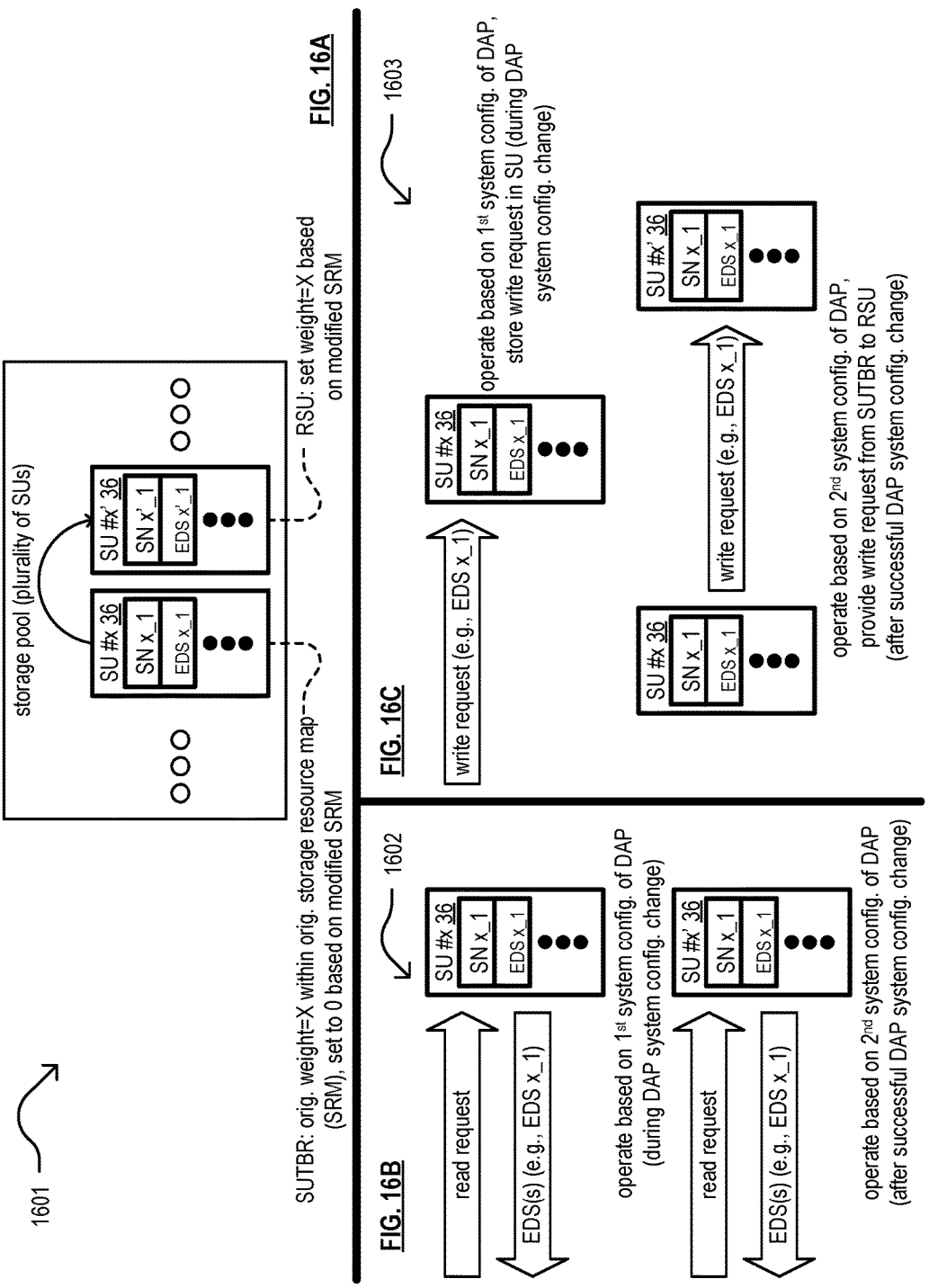
Figure 17:
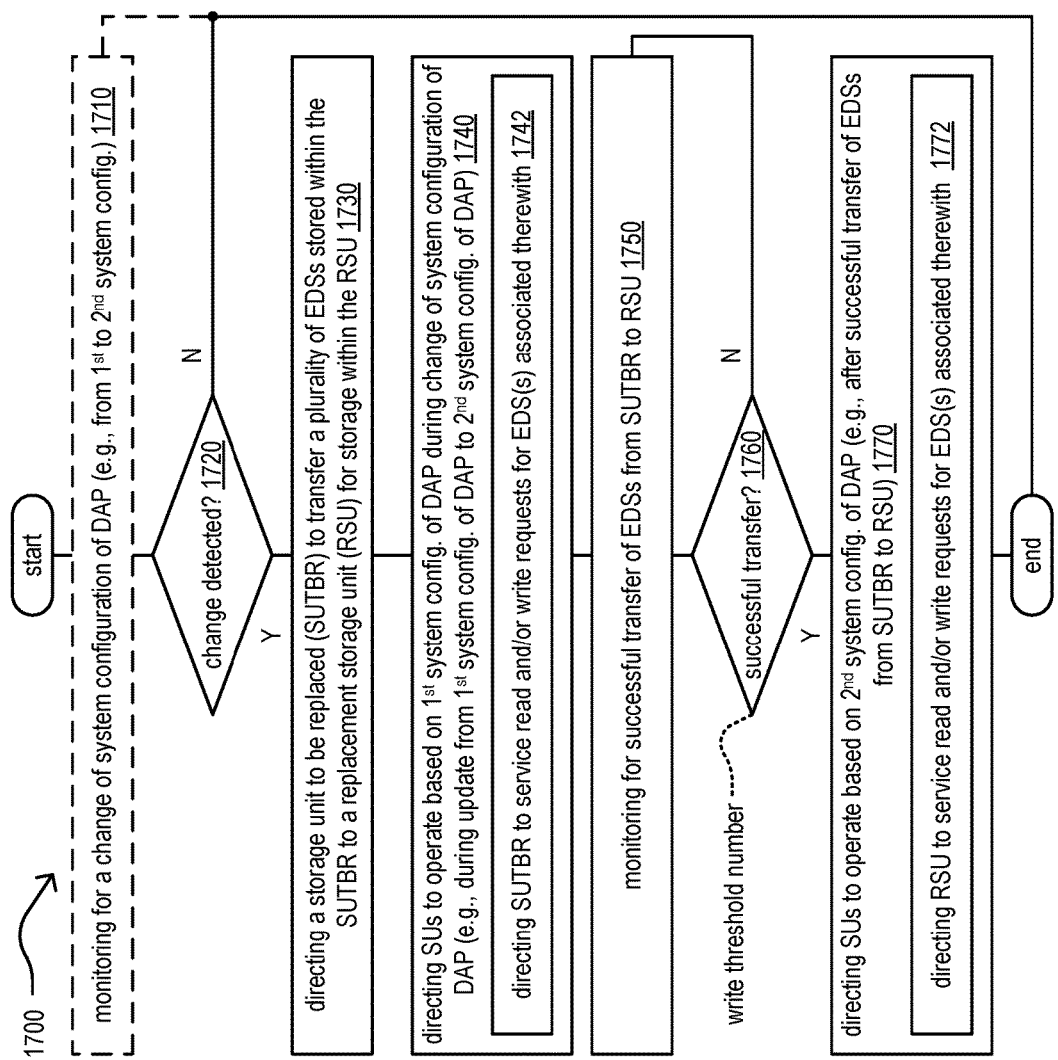

FIG. 16A, FIG. 16B, and FIG. 16C are schematic block diagrams of examples of replacement of a SU within a storage pool in accordance with the present invention; and FIG. 17 is a diagram illustrating an embodiment of a method for execution by one or more computing devices.

DETAILED DESCRIPTION OF THE INVENTION

Figure 1:
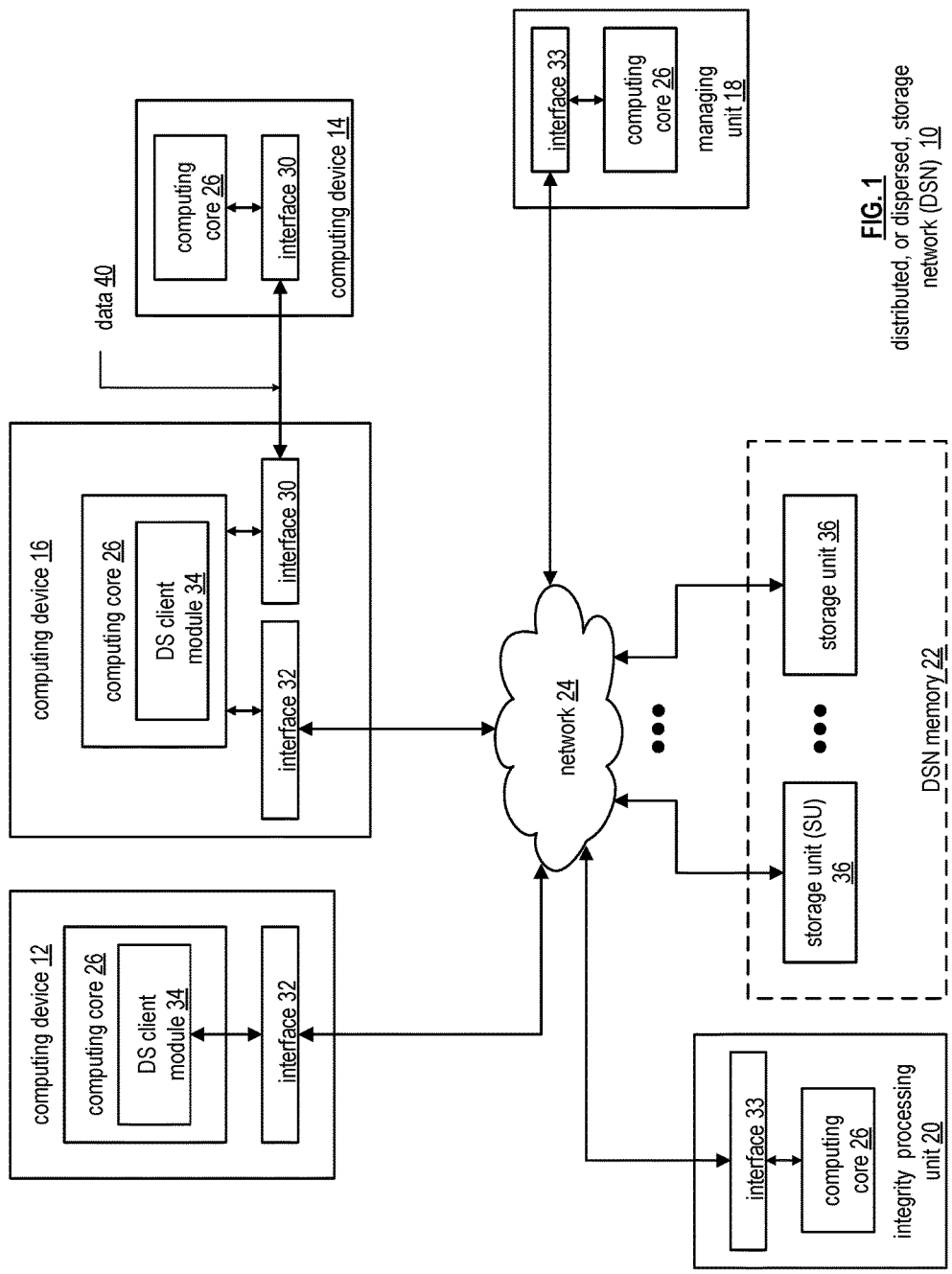
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
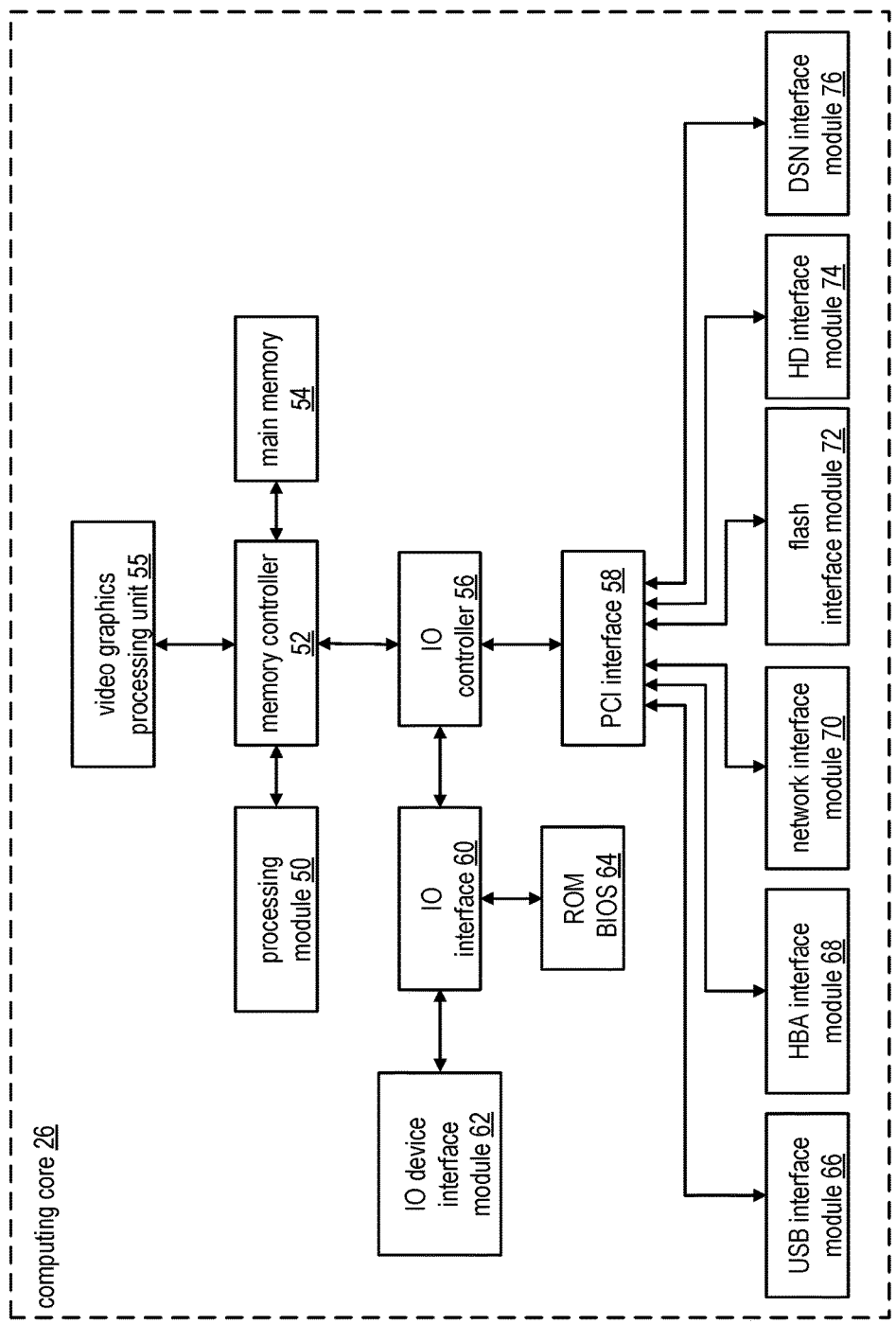
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
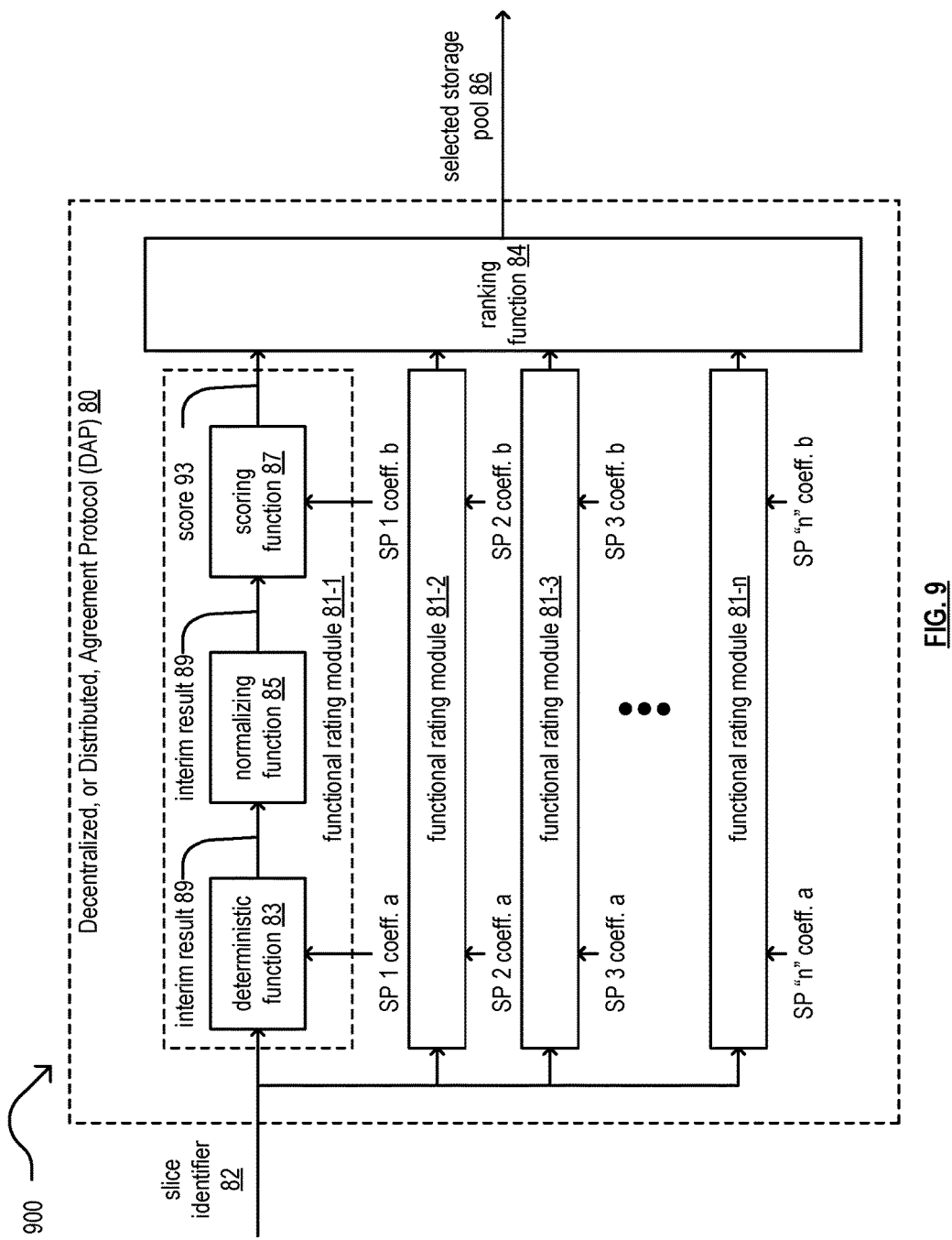
FIG. 9 is a schematic block diagram of an embodiment of Decentralized, or Distributed, Agreement Protocol (DAP) in accordance with the present invention.

FIG. 9 is a schematic block diagram 900 of an embodiment of a decentralized, or distributed, agreement protocol (DAP) 80 that may be implemented by a computing device, a storage unit, and/or any other device or unit of the DSN to determine where to store encoded data slices or where to find stored encoded data slices. The DAP 80 includes a plurality of functional rating modules 81. Each of the functional rating modules 81 includes a deterministic function 83, a normalizing function 85, and a scoring function 87.

Each functional rating module 81 receives, as inputs, a slice identifier 82 and storage pool (SP) coefficients (e.g., a first functional rating module 81-1 receives SP 1 coefficients "a" and b). Based on the inputs, where the SP coefficients are different for each functional rating module 81, each functional rating module 81 generates a unique score 93 (e.g., an alpha-numerical value, a numerical value, etc.). The ranking function 84 receives the unique scores 93 and orders them based on an ordering function (e.g., highest to lowest, lowest to highest, alphabetical, etc.) and then selects one as a selected storage pool 86. Note that a storage pool includes one or more sets of storage units 86. Further note that the slice identifier 82 corresponds to a slice name or common attributes of set of slices names. For example, for a set of encoded data slices, the slice identifier 120 specifies a data segment number, a vault ID, and a data object ID, but leaves open ended, the pillar number. As another example, the slice identifier 82 specifies a range of slice names (e.g., 0000 0000 to FFFF FFFF).

As a specific example, the first functional module 81-1 receives the slice identifier 82 and SP coefficients for storage pool 1 of the DSN. The SP coefficients includes a first coefficient (e.g., "a") and a second coefficient (e.g., "b"). For example, the first coefficient is a unique identifier for the corresponding storage pool (e.g., SP #1's ID for SP 1 coefficient "a") and the second coefficient is a weighting factor for the storage pool. The weighting factors are derived to ensure, over time, data is stored in the storage pools in a fair and distributed manner based on the capabilities of the storage units within the storage pools.

For example, the weighting factor includes an arbitrary bias which adjusts a proportion of selections to an associated location such that a probability that a source name will be mapped to that location is equal to the location weight divided by a sum of all location weights for all locations of comparison (e.g., locations correspond to storage units). As a specific example, each storage pool is associated with a location weight factor based on storage capacity such that, storage pools with more storage capacity have a higher location weighting factor than storage pools with less storage capacity.

The deterministic function 83, which may be a hashing function, a hash-based message authentication code function, a mask generating function, a cyclic redundancy code function, hashing module of a number of locations, consistent hashing, rendezvous hashing, and/or a sponge function, performs a deterministic function on a combination and/or concatenation (e.g., add, append, interleave) of the slice identifier 82 and the first SP coefficient (e.g., SU 1 coefficient "a") to produce an interim result 89.

The normalizing function 85 normalizes the interim result 89 to produce a normalized interim result 91. For instance, the normalizing function 85 divides the interim result 89 by a number of possible output permutations of the deterministic function 83 to produce the normalized interim result. For example, if the interim result is 4,325 (decimal) and the number of possible output permutations is 10,000, then the normalized result is 0.4325.

The scoring function 87 performs a mathematical function on the normalized result 91 to produce the score 93. The mathematical function may be division, multiplication, addition, subtraction, a combination thereof, and/or any mathematical operation. For example, the scoring function divides the second SP coefficient (e.g., SP 1 coefficient "b") by the negative log of the normalized result (e.g., $e^y=x$ and/or $\ln(x)=y$). For example, if the second SP coefficient is 17.5 and the negative log of the normalized result is 1.5411 (e.g., $e^{(0.4235)}$), the score is 11.3555.

The ranking function 84 receives the scores 93 from each of the function rating modules 81 and orders them to produce a ranking of the storage pools. For example, if the ordering is highest to lowest and there are five storage units in the DSN, the ranking function evaluates the scores for five storage units to place them in a ranked order. From the ranking, the ranking module 84 selects one the storage pools 86, which is the target for a set of encoded data slices.

The DAP 80 may further be used to identify a set of storage units, an individual storage unit, and/or a memory device within the storage unit. To achieve different output results, the coefficients are changed according to the desired location information. The DAP 80 may also output the ranked ordering of the scores.

Figure 10:
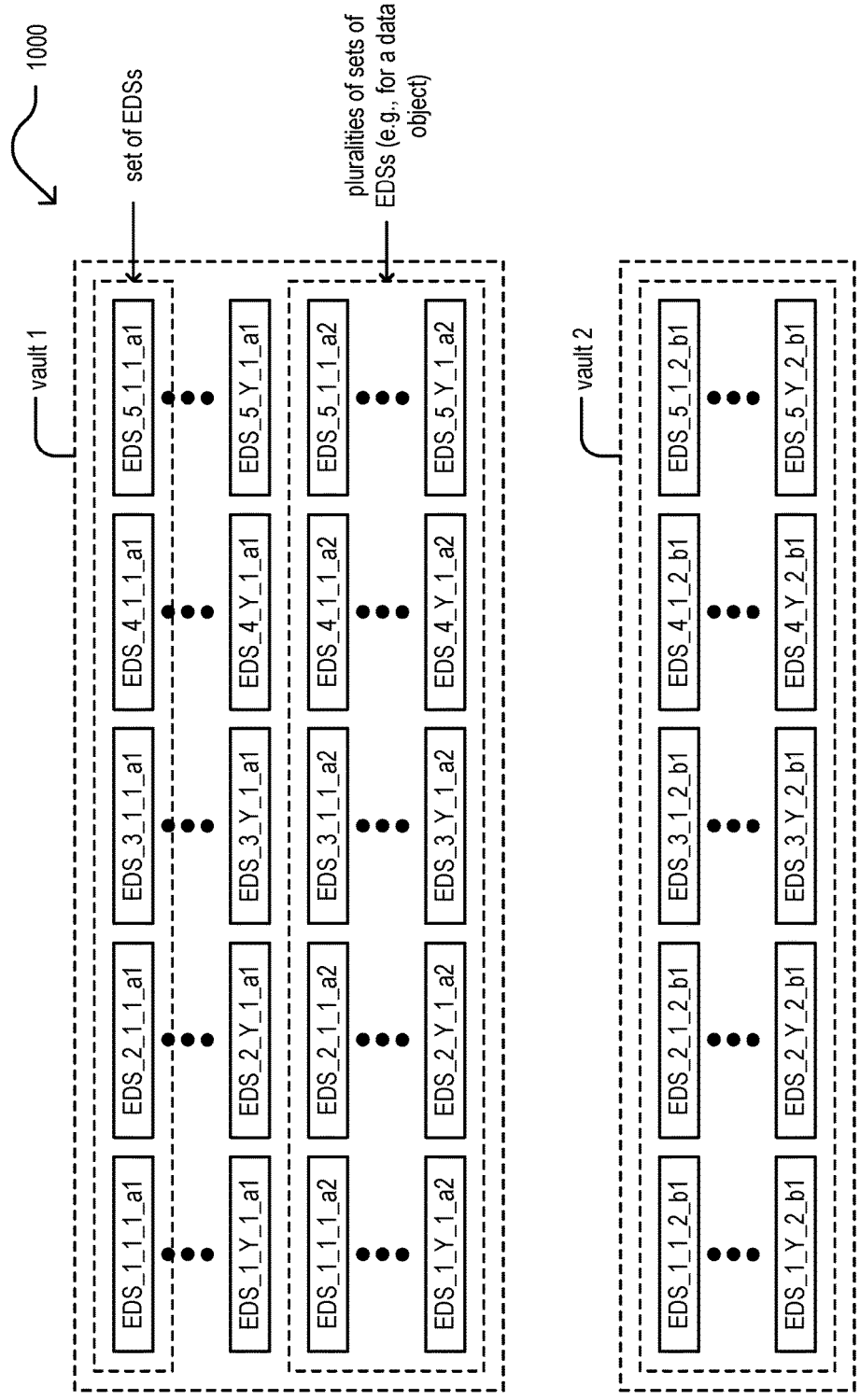
FIG. 10 is a schematic block diagram of an example of creating pluralities of sets of slices in accordance with the present invention.

FIG. 10 is a schematic block diagram 1000 of an example of creating pluralities of sets of slices. Each plurality of sets of encoded data slices (EDSs) corresponds to the encoding of a data object, a portion of a data object, or multiple data object, where a data object is one or more of a file, text, data, digital information, etc. For example, the highlighted plurality of encoded data slices corresponds to a data object having a data identifier of "a2".

Each encoded data slices of each set of encoded data slices is uniquely identified by its slice name, which is also used as at least part of the DSN address for storing the encoded data slice. As shown, a set of EDSs includes EDS 1_1_1_a1 through EDS 5_1_1_a1. The EDS number includes pillar number, data segment number, vault ID, and data object ID. Thus, for EDS 1_1_1_a1, it is the first EDS of a first data segment of data object "a1" and is to be stored, or is stored, in vault 1. Note that vaults are a logical memory container supported by the storage units of the DSN. A vault may be allocated to one or more user computing devices.

As is further shown, another plurality of sets of encoded data slices are stored in vault 2 for data object "b1". There are Y sets of EDSs, where Y corresponds to the number of data segments created by segmenting the data object. The last set of EDSs of data object "b1" includes EDS 1_Y_2_b1 through EDS 5_Y_2_b1. Thus, for EDS 1_Y_2_b1, it is the first EDS of the last data segment "Y" of data object "b1" and is to be stored, or is stored, in vault 2.

Figure 11:
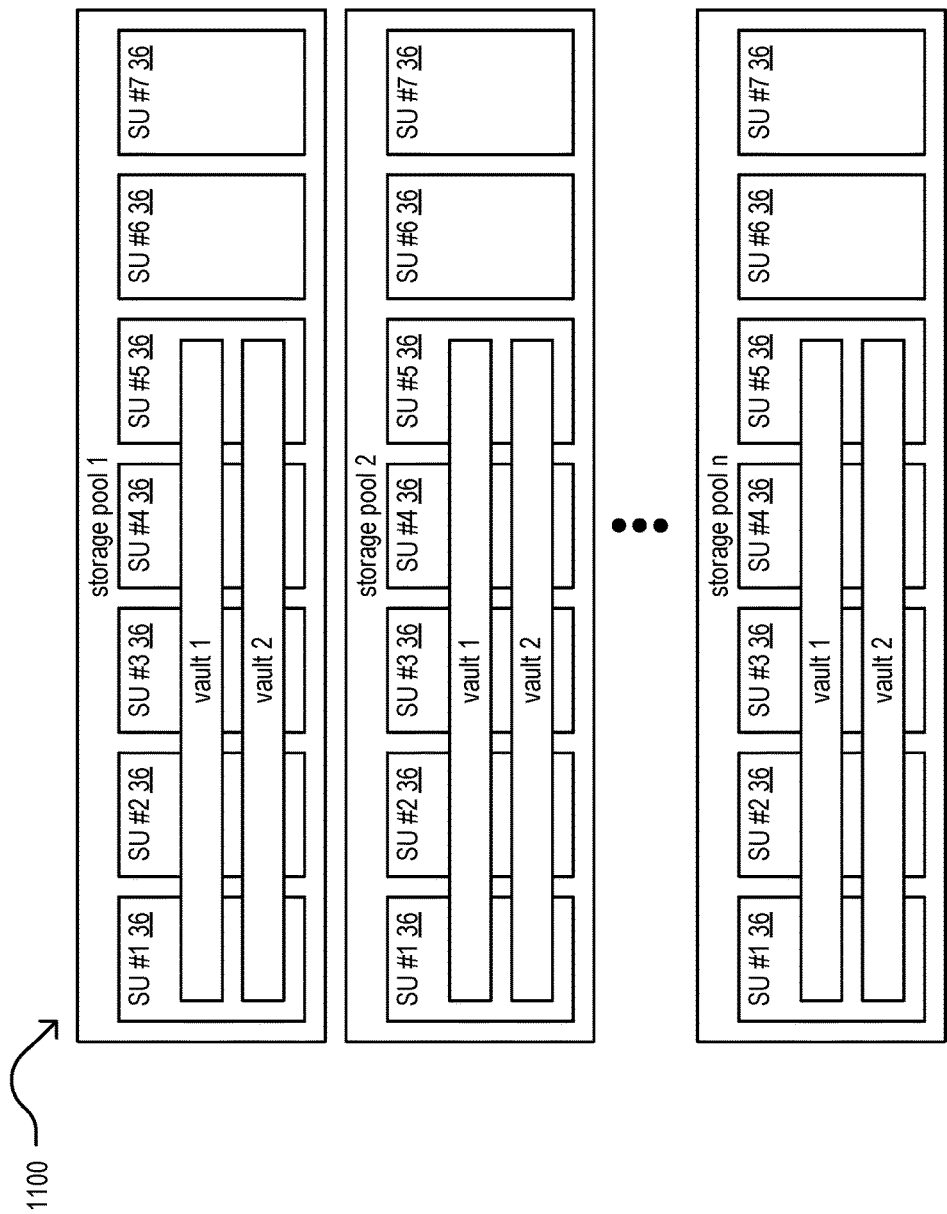
FIG. 11 is a schematic block diagram of an example of storage vaults in accordance with the present invention.

FIG. 11 is a schematic block diagram 1100 of an example of storage vaults spanning multiple storage pools. In this example, the DSN memory 22 includes a plurality of storage units 36 arranged into a plurality of storage pools (e.g., 1-n). In this example, each storage pool includes seven storage units for ease of illustration. A storage pool, however, can have many more storage units than seven and, from storage pool to storage pool, may have different numbers of storage units.

The storage pools 1-n support two vaults (vault 1 and vault 2) using only five of seven of the storage units. The number of storage units within a vault correspond to the pillar width number, which is five in this example. Note that a storage pool may have rows of storage units, where SU #1 represents a plurality of storage units, each corresponding to a first pillar number; SU #2 represents a second plurality of storage units, each corresponding to a second pillar number; and so on. Note that other vaults may use more or less than a width of five storage units.

Figure 12:
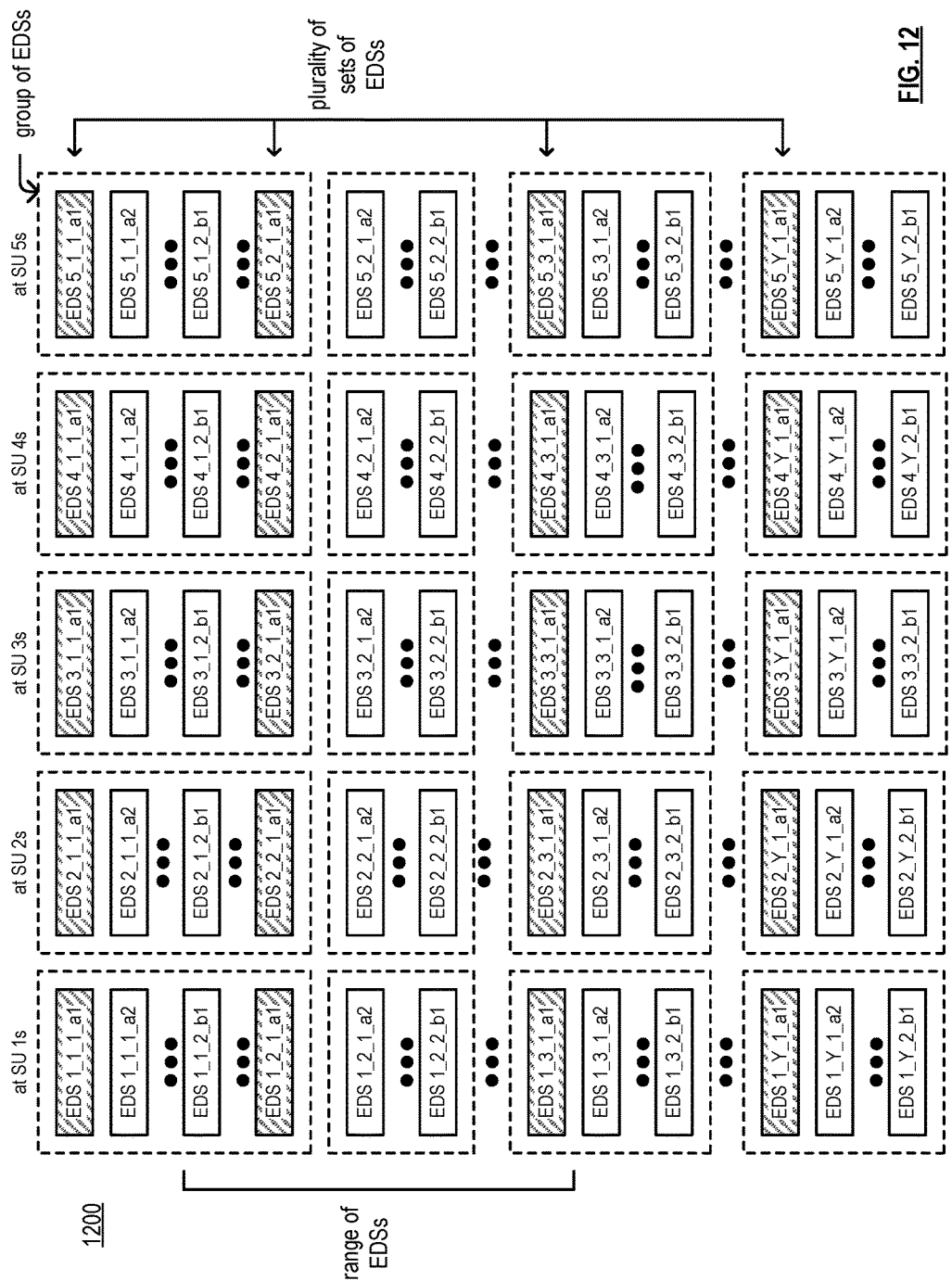
FIG. 12 is a schematic block diagram of an example of storing pluralities of sets of slices in accordance with the present invention.

FIG. 12 is a schematic block diagram 1200 of an example of storing pluralities of sets of slices in accordance with the Decentralized, or Distributed, Agreement Protocol (DAP) 80 of FIG. 9. The DAP 80 uses slice identifiers (e.g., the slice name or common elements thereof (e.g., the pillar number, the data segment number, the vault ID, and/or the data object ID)) to identify, for one or more sets of encoded data slices, a set, or pool, of storage units. With respect to the three pluralities of sets of encoded data slices (EDSs) of FIG. 11, the DAP 80 approximately equally distributes the sets of encoded data slices throughout the DSN memory (e.g., among the various storage units).

The first column corresponds to storage units having a designation of SU #1 in their respective storage pool or set of storage units and stores encoded data slices having a pillar number of 1. The second column corresponds to storage units having a designation of SU #2 in their respective storage pool or set of storage units and stores encoded data slices having a pillar number of 2, and so on. Each column of EDSs is divided into one or more groups of EDSs. The delineation of a group of EDSs may correspond to a storage unit, to one or more memory devices within a storage unit, or multiple storage units. Note that the grouping of EDSs allows for bulk addressing, which reduces network traffic.

A range of encoded data slices (EDSs) spans a portion of a group, spans a group, or spans multiple groups. The range may be numerical range of slice names regarding the EDSs, one or more source names (e.g., common aspect shared by multiple slice names), a sequence of slice names, or other slice selection criteria.

Figure 13:
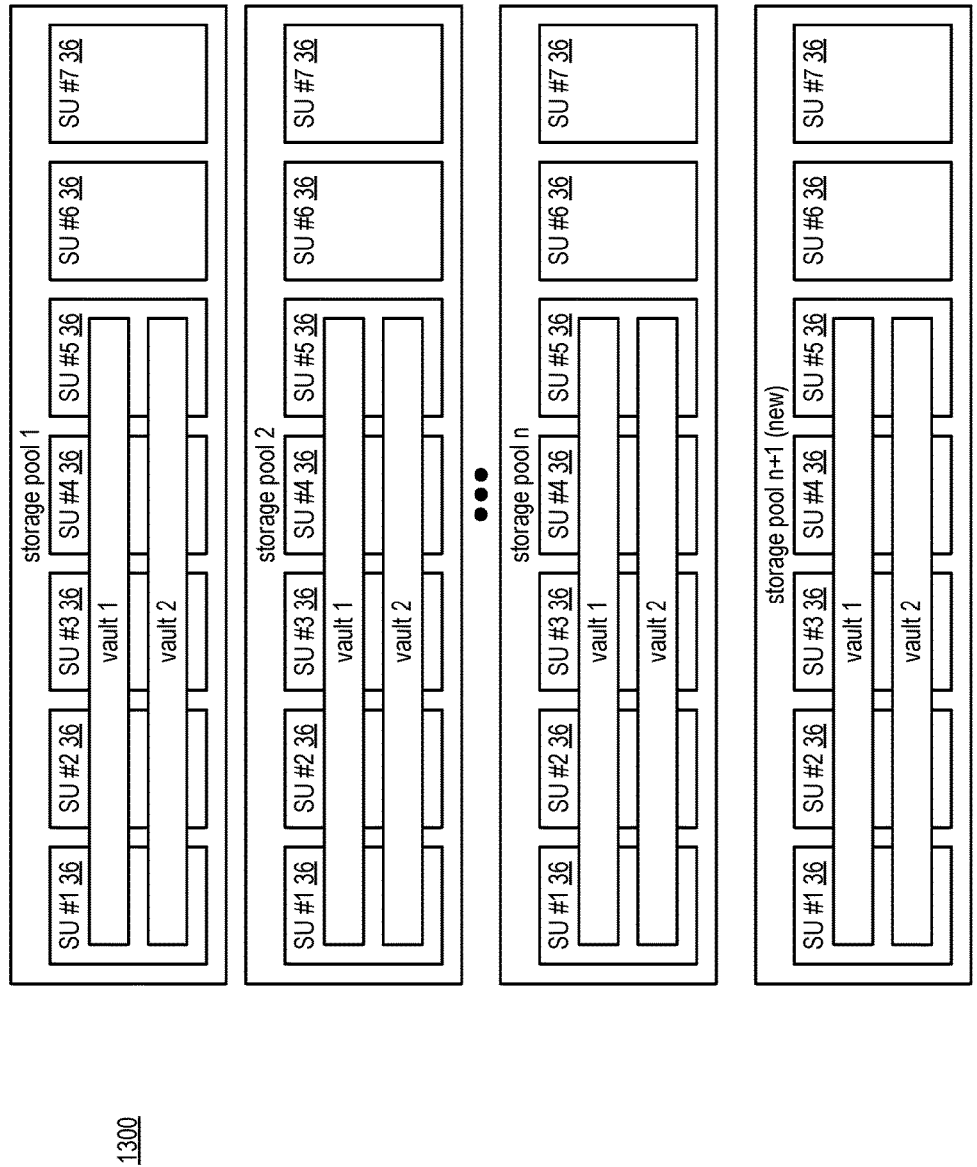
FIG. 13 is a schematic block diagram of an example of adding a storage pool to the DSN in accordance with the present invention.

FIG. 13 is a schematic block diagram 1300 of an example of adding a storage pool to the DSN. In this example storage pool n+1 is added and is supporting vaults 1 and 2. As result, the Decentralized, or Distributed, Agreement Protocol (DAP) 80 of FIG. 9 is changed to include another functional rating module 81 for the new storage pool and the second coefficients (e.g., "b", which correspond to the weight factor) are adjusted for some, if not all, of the other functional rating modules 81. As a result of changing the DAP 80, storage responsibility for encoded data slices is going to change, causing them to be transferred between the storage units. When there are significant numbers of encoded data slices to be transferred and there are hundreds to tens of thousands of resources in the DSN (e.g., computing devices, storage units, managing units, integrity units performing rebuilding, etc.), the updating of the DSN is complex and time consuming.

While the DSN is being updated based on the new DAP, data access requests, listing requests, and other types of requests regarding the encoded data slices are still going to be received and need to be processed in a timely manner. Such requests will be based on the old DAP. As such, a request for an encoded data slice (EDS), or information about the EDS, will go to the storage unit identified using the DAP 80 prior to updating it. If the storage unit has already transferred the EDS to the storage unit identified using the new DAP 80, then the storage unit functions as proxy for the new storage unit and the requesting device.

Figure 14:
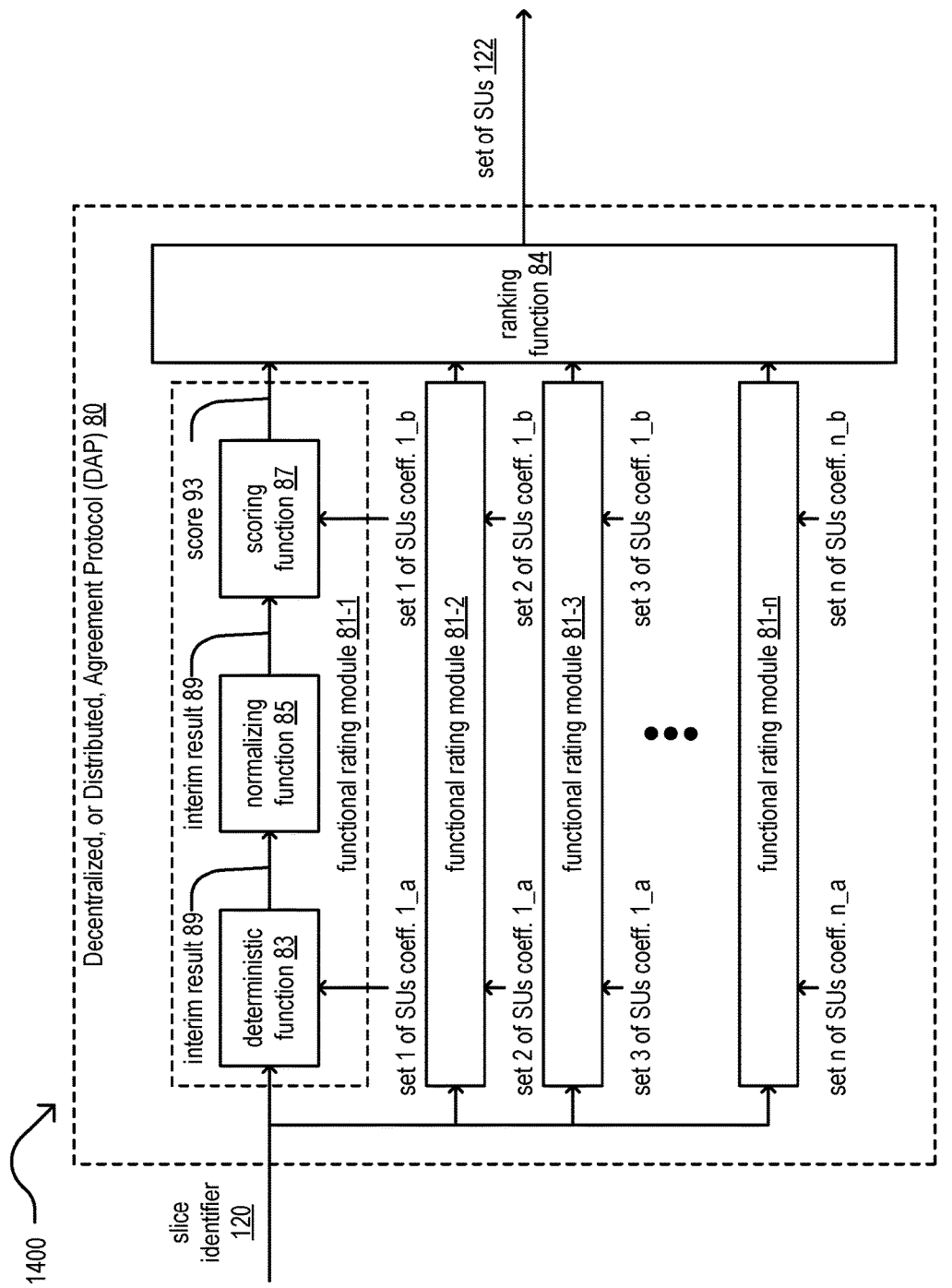
FIG. 14 is a schematic block diagram of an embodiment of a decentralized, or distributed, agreement protocol (DAP) for generating identified set of storage units in accordance with the present invention.

FIG. 14 is a schematic block diagram of an embodiment 1400 of a decentralized, or distributed, agreement protocol (DAP) for generating identified set of storage units in accordance with the present invention. The DAP 80 is similar to the DAP of FIG. 9, but uses a slice identifier 120 instead of a source name 82, uses coefficients for a set of storage units instead of for individual storage units, and the ranking function 84 outputs an identified set of storage units 122 instead of a storage unit ranking 86. The slice identifier 120 corresponds to a slice name or common attributes of set of slices names. For example, for a set of encoded data slices, the slice identifier 120 specifies a data segment number, a vault ID, and a data object ID, but leaves open ended, the pillar number.

In an example of the operation, each of the functional rating modules 81 generates a score 93 for each set of the storage units based on the slice identifier 120. The ranking function 84 orders the scores 93 to produce a ranking. But, instead of outputting the ranking, the ranking function 84 outputs one of the scores, which corresponds to the identified set of storage units.

As can be seen, such a DAP may be implemented and executed for many different applications including for the determination of where to store encoded data slices or where to find stored encoded data slices such as with respect to FIG. 9 as well as the identification of a set of storage units (SUs) such as with respect to FIG. 14. Based on differently provided input to the DAP, differently provided information may be output. Generally speaking, the more detailed information is that is provided to the DAP, then the more detailed information will be output when from the DAP when executed.

Figure 15:
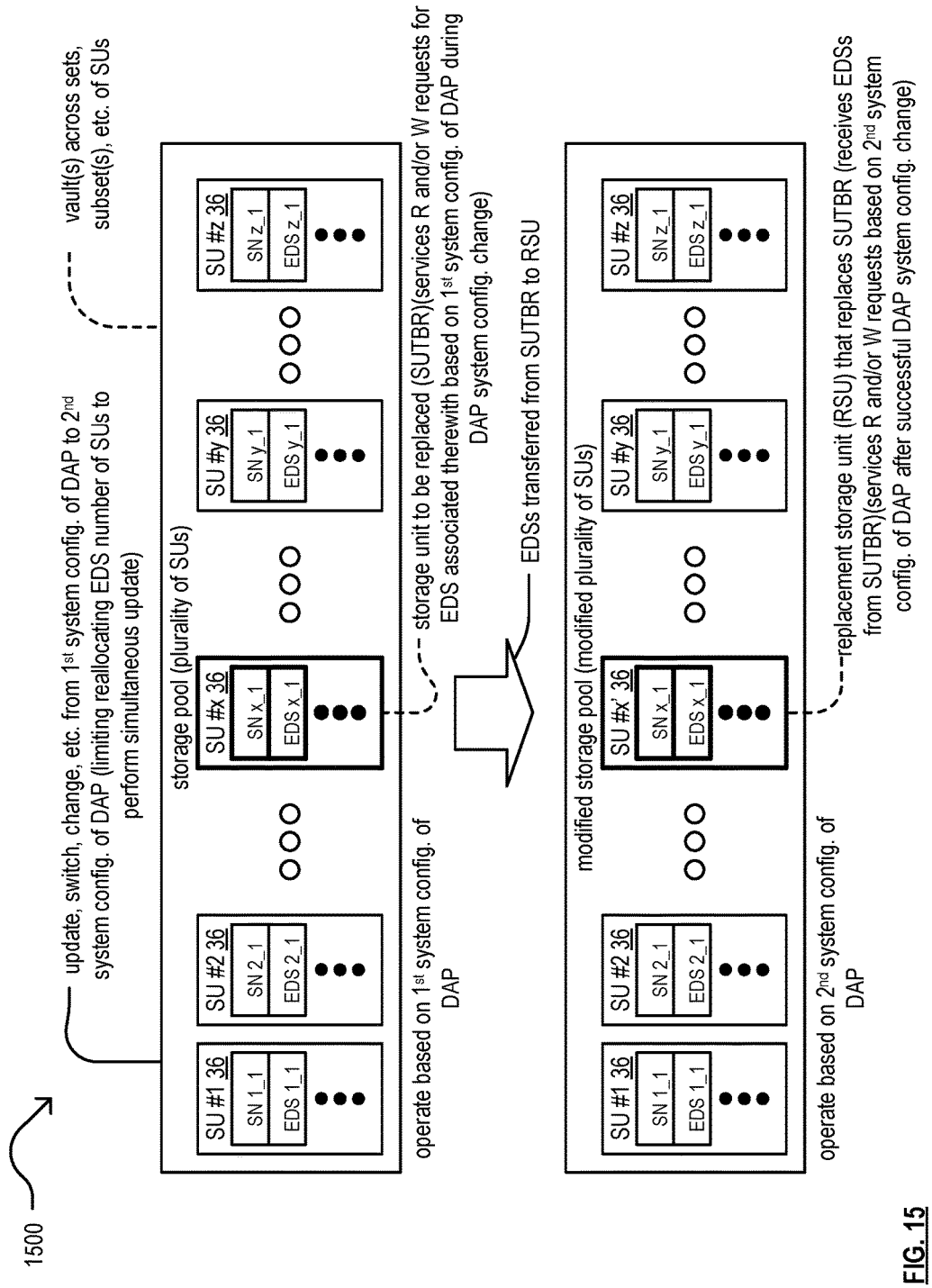
FIG. 15 is a schematic block diagram of an example of a replacement of a storage unit (SU) within a storage pool in accordance with the present invention.

FIG. 15 is a schematic block diagram of an example 1500 of a replacement of a storage unit (SU) within a storage pool in accordance with the present invention. A storage pol includes a plurality of storage units (SUs) (e.g., shown as SU #1 36 through SU #x 36 through SU #y 36 through SU #z 36), each respectively storing information such as slice name (SN) and encoded data slice (EDS) for a plurality of slices of at least a pillar width (e.g., the slices are shown as being stored respectively across the SUs such that a respective SN and EDS is shown as being stored within each respective SU).

From certain perspectives, EDS sets that correspond respectively to data segments of a data object are distributedly stored across the plurality of storage units SUs within the DSN (e.g., shown in this example 1500 as across the plurality of SUs of a storage pool). The data object is segmented into the plurality of data segments, and a data segment of the plurality of data segments is dispersed error encoded in accordance with dispersed error encoding parameters to produce a set of EDSs of the EDS sets that is of pillar width having a plurality of EDS names. A read threshold number of EDSs of the set of EDSs provides for reconstruction of the data segment, and a write threshold number of EDSs of the set of EDSs provides for a successful transfer of the set of EDSs from a first at least one location in the DSN to a second at least one location in the DSN. The data object is associated with a unique source name, and each EDS name of the plurality of EDS names includes a reference to the unique source name.

The SUs of the storage pool operate based on a DAP. For various reasons, the DAP may undergo a system configuration (e.g., expansion of the storage pool by adding one or more SUs, removing one or more SUs from the storage pool, replacing one or more SUs within the storage pool, modification of one or more dispersed error encoding parameters, etc.). For example, in a DSN memory, storage capacity may be added to expand the storage pool by adding one a SU (or SU set) to it.

In an example of operation and implementation, a computing device is configured to operate to monitor for a change of system configuration of the DAP (e.g., from a first to a second system configuration of the DAP). Alternatively, a computing device may be configured to receive a notification of a change of system configuration of the DAP. In another example, a computing device is configured to poll another device for information regarding a change of system configuration of the DAP. Regardless of the manner by which the computing device may be informed of a change of system configuration of the DAP, the computing device operates to detect a change from a first system configuration of a Decentralized, or Distributed, Agreement Protocol (DAP) to a second system configuration of the DAP to a second system configuration of the DAP. Such a change may be precipitated based on addition or removal of at least one SU within a plurality of SUs within the DSN (e.g., within a storage pool of the DSN).

As described herein, the first system configuration of the DAP and the second system configuration of the DAP respectively provide for deterministic calculation of locations of encoded data slice (EDS) sets that correspond respectively to a plurality of data segments of a data object that are distributedly stored across the plurality of storage units SUs within the DSN (e.g., within the storage pool of the DSN).

The computing device detects a change from a first system configuration of the DAP to a second system configuration of the DAP based on a storage unit to be replaced (SUTBR) (e.g., shown as SU#x 36) within SUs within the DSN (e.g., within the storage pool of the DSN). Again, the first system configuration of the DAP and the second system configuration of the DAP respectively provide for deterministic calculation of locations of EDS sets that correspond respectively to a plurality of data segments of a data object that are distributedly stored SUs within the DSN (e.g., within the storage pool of the DSN). The computing device then directs the SUTBR to transfer a plurality of EDSs stored within the SUTBR to a replacement storage unit (RSU) (e.g., shown as SU#x' 36) for storage within the RSU.

During transfer of the plurality of EDSs from the SUTBR to the RSU, the computing device directs the plurality of SUs to operate based on the first system configuration of the DAP. Also, in some examples, the computing device directs the SUTBR to service read requests and write requests from one or more other computing devices for at least one EDS of the plurality of EDSs based on the first system configuration of the DAP during transfer of the plurality of EDSs from the SUTBR to the RSU.

Then, when the plurality of EDSs have been successfully transferred from the SUTBR to the RSU, the computing device directs the plurality of SUs to operate based on the second system configuration of the DAP. Also, in some examples, the computing device directs the direct RSU to service read and write requests from the one or more other computing devices for the at least one EDS of the plurality of EDSs based on the second system configuration of the DAP when the plurality of EDSs have been successfully transferred from the SUTBR to the RSU.

FIG. 16A, FIG. 16B, and FIG. 16C are schematic block diagrams 1601, 2602, and 1603 of examples of replacement of a SU within a storage pool in accordance with the present invention.

In some examples and from some perspectives, the update of the system configuration of the DAP from the first system configuration to the second system configuration, reallocation of EDSs may be viewed as a process by which a DAP is used to reallocate (e.g., migrate in some instances) EDSs from one location to another (e.g., from one SU to another, such as from the SUTBR to the RSU). In some embodiments, this can be used to reallocate EDS between SU sets (storage pool(s)) within a given storage pool. For example, such a reallocation process may be used based on the addition, removal, and/or replacement of SU resources from storage pools in the increment of adding, removing, and/or replacing SU sets (storage pool(s)).

Note that when a SU is to be replaced (e.g., SUTBR to be replaced by the RSU), the reallocation process can require rebuilding of EDSs. Also, this may involve an off-line physical transfer of EDSs or memory devices (e.g., SUs) from the old SU to the new SU (from the SUTBR to the RSU). However, the reallocation process can also be used to handle SU replacement in a more effective manner as described herein.

Referring to example 1601 of FIG. 16A, the SU set (storage pool) and storage pool that contain the SUTBR are identified (e.g., the storage pool (plurality of SUs) that include the SU #x 36, which is the SUTBR). Then, a modified version of the storage resource map (SRM) for the storage pool is created. Based on this, the SU set (storage pool) containing the SUTBR will have its respective weight set to "0" therein, and a new SU set (e.g., that includes the RSU) is created, having a weight set to "X" therein equal to the previous weight of the SU set (storage pool) containing the SUTBR (e.g., set to "X" therein). Then, the new SU set (storage pool) contains all the same devices as the prior SU set (storage pool) containing the SUTBR, except the entry for the SUTBR is replaced with the entry for the RSU. Also, the RSU will have the same "hash seed" as the SUTBR that now will now have its respective weight set to "0" therein. A reallocation process is triggered from the old SRM to the newly modified SRM that contains the RSU, the modified weights, and the SU set (storage pool) having the RSU replaced with the SUTBR.

As the reallocation proceeds, all other SUs, aside from the SUTBR, discover that they do not have any anything (e.g., any EDSs) to transfer as they are not in the changed SU set (storage pool) and because there were no weight changes for the total of all SU sets with the same hash seed. Alternatively, all other SUs, aside from the SUTBR, discover that they do not have any anything (e.g., any EDSs) to transfer because the SU without which they would be reallocating EDSs in the new SU set (storage pool) is itself (e.g., the same SU set (storage pool)). Based on this, each SU in the modified, new SU set (storage pool) discovers this fact, except for the replaced device).

The SUTBR, however, finds that it is in a SU set (storage pool) with a zero weight, and that the destination it should move its EDSs to is a SU different from itself. It therefore ends up transferring all of its EDSs to the RSU in the new SU set (storage pool). Also, in some examples, note that the SUTBR remains fully online throughout, responds to read requests, and stores write requests, and the entire process of update completes without any rebuilding.

In some examples, note that the DAP, when executed using the unique source name and coefficients regarding the plurality of SUs of the DSN, produces a ranking of the plurality of SUs that deterministically identifies those SUs of the plurality of SUs that store the EDS sets including the set of EDSs of the EDS sets. In an example of operation and implementation, computing device updates the coefficients regarding the plurality of SUs based on the change from the first system configuration of the DAP to the second system configuration of the DAP.

In another example of operation and implementation, the computing device identifies a storage resource map (SRM) for the plurality of SUs including the SUTBR. Then, when the plurality of EDSs have been successfully transferred from the SUTBR to the RSU, the computing device updates the SRM by replacing a first entry associated with the SUTBR with a second entry associated with the RSU.

Referring to example 1602 of FIG. 16B, in this example of operation and implementation, the computing device directs the SUTBR (e.g., SU #x 36) to respond to a read request from another computing device for the at least one EDS of the plurality of EDSs by providing the at least one EDS of the plurality of EDSs stored within the SUTBR (e.g., SU #x 36) to the another computing device during transfer of the plurality of EDSs from the SUTBR to the RSU based on the first system configuration of the DAP. Then, after the plurality of EDSs have been successfully transferred from the SUTBR to the RSU based on the update of the DAP from the first system configuration of the DAP to the second system configuration of the DAP, the computing device directs the RSU (e.g., SU #x' 36) to respond to a read request from another computing device for the at least one EDS of the plurality of EDSs by providing the at least one EDS of the plurality of EDSs stored within the RSU (e.g., SU #x' 36) to the another computing device during transfer of the plurality of EDSs from the SUTBR to the RSU based on the second system configuration of the DAP.

Referring to example 1603 of FIG. 16C, in this example of operation and implementation, the computing device directs the SUTBR (e.g., SU #x 36) to respond to a write request from another computing device to write the at least one EDS of the plurality of EDSs by storing the write request from the another computing device during transfer of the plurality of EDSs from the SUTBR to the RSU (e.g., SU #x' 36). Then, the computing device directs the SUTBR (e.g., SU #x 36) to provide the write request that has been stored in the SUTBR (e.g., SU #x 36) from the SUTBR (e.g., SU #x 36) to the RSU when the plurality of EDSs have been successfully transferred from the SUTBR to the RSU for storage of the at least one EDS of the plurality of EDSs within the RSU based on the second system configuration of the DAP.

In some examples, the computing device is located at a first premises that is remotely located from at least one SU of the plurality of SUs within the DSN. In other examples, the computing device may itself be a SU of the plurality of SUs within the DSN. Alternatively, the computing device is a wireless smart phone, a laptop, a tablet, a personal computers (PC), a work station, and/or a video game device.

Note also that the DSN may be implemented to include a wireless communication system, a wire lined communication systems, a non-public intranet system, a public internet system, a local area network (LAN), and/or a wide area network (WAN).

FIG. 17 is a diagram illustrating an embodiment of a method 1700 for execution by one or more computing devices. In some optional examples, the method 1700 operates by monitoring for a change of system configuration of the DAP (e.g., from a first to a second system configuration of the DAP) (block 1710). Alternatively, the method 1700 may operate by receiving a notification of a change of system configuration of the DAP. In another example, the method 1700 may operate by polling another device for information regarding a change of system configuration of the DAP. Regardless of the manner by which the method 1700 is informed of a change of system configuration of the DAP, the method 1700 operates by detecting a change from a first system configuration of a Decentralized, or Distributed, Agreement Protocol (DAP) to a second system configuration of the DAP to a second system configuration of the DAP. Such a change may be precipitated based on addition or removal of at least one SU within a plurality of SUs within the DSN (e.g., within a storage pool of the DSN).

When the method 1700 operates by detecting no change of from a first system configuration of the DAP to a second system configuration of the DAP to a second system configuration of the DAP (block 1720), the method 1700 ends or continues monitoring for a change, update, etc. (e.g., loops back to block 1710). Alternatively, when the method 1700 operates by detecting a change of from the first system configuration of the DAP to the second system configuration of the DAP to a second system configuration of the DAP (block 1720), the method 1700 operates by directing a storage unit to be replaced (SUTBR) to transfer a plurality of EDSs stored within the SUTBR to a replacement storage unit (RSU) for storage within the RSU (block 1730). Note that this detection of a change of from the first system configuration of the DAP to the second system configuration of the DAP to a second system configuration of the DAP may be based on a SUTBR within a plurality of storage units (SUs) within a dispersed storage network (DSN) to be replaced by a replacement storage unit (RSU).

The, during transfer of the plurality of EDSs from the SUTBR to the RSU (e.g., during update from the first system configuration of the DAP to the second system configuration of the DAP), the method 1700 operates by directing the plurality of SUs to operate based on the first system configuration of the DAP (block 1740). Also, in some examples, the method 1700 operates by directing the SUTBR to service read requests and write requests from one or more other computing devices for at least one EDS of the plurality of EDSs based on the first system configuration of the DAP (block 1742).

The method 1700 then operates by monitoring for whether the plurality of EDSs having been successfully transferred from the SUTBR to the RSU (e.g., monitor for successful update from the first system configuration of the DAP to the second system configuration of the DAP)(block 1750). During the transfer of the plurality of EDSs from the SUTBR to the RSU (e.g., during update from the first system configuration of the DAP to the second system configuration of the DAP), the method 1700 will loop back to the monitoring of block 1750.

However, when the method 1700 operates by detecting that the plurality of EDSs have been successfully transferred from the SUTBR to the RSU (e.g., a successful update from the first system configuration of the DAP to the second system configuration of the DAP has been detected) (block 1760), then the method 1700 operates by directing the plurality of SUs to operate based on the second system configuration of the DAP (block 1770). Also, in some examples, the method 1700 operates by directing the RSU to service read and write requests from the one or more other computing devices for the at least one EDS of the plurality of EDSs based on the second system configuration of the DAP (block 1772).

In some examples, the basis for determining the plurality of EDSs have been successfully transferred from the SUTBR to the RSU (e.g., a successful update from the first system configuration of the DAP to the second system configuration of the DAP has been detected) may be a write threshold number of EDSs of the set of EDSs such that the write threshold number of EDSs provides for a successful transfer of the set of EDSs from a first at least one location in the DSN to a second at least one location in the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, nonvolatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A storage unit (SU) comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
based on a change from a first system configuration of a Decentralized, or Distributed, Agreement Protocol (DAP) to a second system configuration of the DAP based on a storage unit to be replaced (SUTBR) within a plurality of storage units (SUs) that includes the SU within the DSN, operate based on the first system configuration of the DAP and service read and write requests from one or more computing devices for at least one encoded data slice (EDS) that is stored within the SU based on the first system configuration of the DAP during transfer of a plurality of EDSs from the SUTBR to a replacement storage unit (RSU) for storage within the RSU, wherein:
the first system configuration of the DAP and the second system configuration of the DAP respectively provide for deterministic calculation of locations of EDS sets that correspond respectively to a plurality of data segments of a data object that are distributedly stored across the plurality of SUs within the DSN;
the data object is segmented into the plurality of data segments, and a data segment of the plurality of data segments is dispersed error encoded in accordance with dispersed error encoding parameters to produce a set of EDSs of the EDS sets that is of pillar width having a plurality of EDS names;
a write threshold number of EDSs of the set of EDSs provides for a successful transfer of the set of EDSs from a first at least one location in the DSN to a second at least one location in the DSN; and
operate based on the second system configuration of the DAP and service other read and write requests from the one or more computing devices for the at least one EDS that is stored within the SU based on the second system configuration of the DAP after the plurality of EDSs have been successfully transferred from the SUTBR to the RSU.

2. The SU of claim 1, wherein:
a read threshold number of EDSs of the set of EDSs provides for reconstruction of the data segment;
the data object is associated with a unique source name; and
each EDS name of the plurality of EDS names includes a reference to the unique source name.

3. The SU of claim 2, wherein:
the DAP, when executed using the unique source name and coefficients regarding the plurality of SUs of the DSN, produces a ranking of the plurality of SUs that deterministically identifies those SUs of the plurality of SUs that store the EDS sets including the set of EDSs of the EDS sets; and
processing circuitry is further configured to execute the operational instructions to update at least one of the coefficients that corresponds to the SU based on the change from the first system configuration of the DAP to the second system configuration of the DAP.

4. The SU of claim 1, wherein:
a storage resource map (SRM) for the plurality of SUs including the SUTBR is updated by replacing a first entry associated with the SUTBR with a second entry associated with the RSU after the plurality of EDSs have been successfully transferred from the SUTBR to the RSU.

5. The SU of claim 1, wherein the processing circuitry is further configured to execute the operational instructions to:
receive direction from at least one of the one or more computing devices to operate based on the first system configuration of the DAP and operate based on the second system configuration of the DAP.

6. The SU of claim 1, wherein the SU is located at a first premises that is remotely located from at least one of the one or more computing devices within the DSN.

7. The SU of claim 1, wherein at least one of the one or more computing devices includes a wireless smart phone, a laptop, a tablet, a personal computers (PC), a work station, or a video game device.

8. The SU of claim 1, wherein the DSN includes at least one of a wireless communication system, a wire lined communication system, a non-public intranet system, a public internet system, a local area network (LAN), or a wide area network (WAN).

9. A storage unit (SU) comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
based on a change from a first system configuration of a Decentralized, or Distributed, Agreement Protocol (DAP) to a second system configuration of the DAP based on a storage unit to be replaced (SUTBR) within a plurality of storage units (SUs) that includes the SU within the DSN, operate based on the first system configuration of the DAP and service read and write requests from one or more computing devices for at least one encoded data slice (EDS) that is stored within the SU based on the first system configuration of the DAP during transfer of a plurality of EDSs from the SUTBR to a replacement storage unit (RSU) for storage within the RSU, wherein:
the first system configuration of the DAP and the second system configuration of the DAP respectively provide for deterministic calculation of locations of EDS sets that correspond respectively to a plurality of data segments of a data object that are distributedly stored across the plurality of SUs within the DSN;
the data object is segmented into the plurality of data segments, and a data segment of the plurality of data segments is dispersed error encoded in accordance with dispersed error encoding parameters to produce a set of EDSs of the EDS sets that is of pillar width having a plurality of EDS names;
a read threshold number of EDSs of the set of EDSs provides for reconstruction of the data segment, and a write threshold number of EDSs of the set of EDSs provides for a successful transfer of the set of EDSs from a first at least one location in the DSN to a second at least one location in the DSN;
the data object is associated with a unique source name; and
each EDS name of the plurality of EDS names includes a reference to the unique source name; and
operate based on the second system configuration of the DAP and service other read and write requests from the one or more computing devices for the at least one EDS that is stored within the SU based on the second system configuration of the DAP after the plurality of EDSs have been successfully transferred from the SUTBR to the RSU, wherein a storage resource map (SRM) for the plurality of SUs including the SUTBR is updated by replacing a first entry associated with the SUTBR with a second entry associated with the RSU after the plurality of EDSs have been successfully transferred from the SUTBR to the RSU.

10. The SU of claim 9, wherein:
the DAP, when executed using the unique source name and coefficients regarding the plurality of SUs of the DSN, produces a ranking of the plurality of SUs that deterministically identifies those SUs of the plurality of SUs that store the EDS sets including the set of EDSs of the EDS sets; and
processing circuitry is further configured to execute the operational instructions to update at least one of the coefficients that corresponds to the SU based on the change from the first system configuration of the DAP to the second system configuration of the DAP.

11. The SU of claim 9, wherein the processing circuitry is further configured to execute the operational instructions to:
receive direction from at least one of the one or more computing devices to operate based on the first system configuration of the DAP and operate based on the second system configuration of the DAP.

12. The SU of claim 9, wherein at least one of:
the SU is located at a first premises that is remotely located from at least one of the one or more computing devices within the DSN; or
the at least one of the one or more computing devices includes a wireless smart phone, a laptop, a tablet, a personal computers (PC), a work station, or a video game device.

13. The SU of claim 9, wherein the DSN includes at least one of a wireless communication system, a wire lined communication system, a non-public intranet system, a public internet system, a local area network (LAN), or a wide area network (WAN).

14. A method for execution by a storage unit (SU), the method comprising:
based on a change from a first system configuration of a Decentralized, or Distributed, Agreement Protocol (DAP) to a second system configuration of the DAP based on a storage unit to be replaced (SUTBR) within a plurality of storage units (SUs) that includes the SU within a dispersed or distributed storage network (DSN), operating based on the first system configuration of the DAP and servicing, via an interface of the SU that is configured to interface and communicate with the DSN, read and write requests from one or more computing devices for at least one encoded data slice (EDS) that is stored within the SU based on the first system configuration of the DAP during transfer of a plurality of EDSs from the SUTBR to a replacement storage unit (RSU) for storage within the RSU, wherein:
the first system configuration of the DAP and the second system configuration of the DAP respectively provide for deterministic calculation of locations of EDS sets that correspond respectively to a plurality of data segments of a data object that are distributedly stored across the plurality of SUs within the DSN;

the data object is segmented into the plurality of data segments, and a data segment of the plurality of data segments is dispersed error encoded in accordance with dispersed error encoding parameters to produce a set of EDSs of the EDS sets that is of pillar width having a plurality of EDS names;

a write threshold number of EDSs of the set of EDSs provides for a successful transfer of the set of EDSs from a first at least one location in the DSN to a second at least one location in the DSN; and operating based on the second system configuration of the DAP and servicing, via the interface, other read and write requests from the one or more computing devices for the at least one EDS that is stored within the SU based on the second system configuration of the DAP after the plurality of EDSs have been successfully transferred from the SUTBR to the RSU.

15. The method of claim 14, wherein:

a read threshold number of EDSs of the set of EDSs provides for reconstruction of the data segment;

the data object is associated with a unique source name; and each EDS name of the plurality of EDS names includes a reference to the unique source name.

16. The method of claim 15, wherein:

the DAP, when executed using the unique source name and coefficients regarding the plurality of SUs of the DSN, produces a ranking of the plurality of SUs that deterministically identifies those SUs of the plurality of SUs that store the EDS sets including the set of EDSs of the EDS sets; and further comprising:

updating at least one of the coefficients that corresponds to the SU based on the change from the first system configuration of the DAP to the second system configuration of the DAP.

17. The method of claim 14, wherein:

a storage resource map (SRM) for the plurality of SUs including the SUTBR is updated by replacing a first entry associated with the SUTBR with a second entry associated with the RSU after the plurality of EDSs have been successfully transferred from the SUTBR to the RSU.

18. The method of claim 14, wherein:

a storage resource map (SRM) for the plurality of SUs including the SUTBR is updated by replacing a first entry associated with the SUTBR with a second entry associated with the RSU after the plurality of EDSs have been successfully transferred from the SUTBR to the RSU.

19. The method of claim 14 further comprising:

receiving, via the interface, direction from at least one of the one or more computing devices to operate based on the first system configuration of the DAP and operate based on the second system configuration of the DAP.

20. The method of claim 14, wherein at least one of:

the SU is located at a first premises that is remotely located from at least one of the one or more computing devices within the DSN;

the at least one of the one or more computing devices includes a wireless smart phone, a laptop, a tablet, a personal computers (PC), a work station, or a video game device; or the DSN includes at least one of a wireless communication system, a wire lined communication system, a non-public intranet system, a public internet system, a local area network (LAN), or a wide area network (WAN).

* * * * *